United States Patent [19]

Sauvage

[11] Patent Number: 4,473,953
[45] Date of Patent: Oct. 2, 1984

[54] APPARATUS FOR CHECKING A SHEET HAVING A BENT PROFILE

[75] Inventor: Philippe Sauvage, Compiegne, France

[73] Assignee: Saint-Gobain Vitrage, Courbevoie, France

[21] Appl. No.: 402,898

[22] Filed: Jul. 29, 1982

[30] Foreign Application Priority Data

Jul. 31, 1981 [FR] France ................. 81 14968

[51] Int. Cl.$^3$ .............. G01B 7/28; B07C 5/08
[52] U.S. Cl. ............... 33/174 L; 33/174 PA; 209/604
[58] Field of Search ......... 33/174 L, 174 P, 174 PA, 33/174 PB; 209/601, 603, 604

[56] References Cited

U.S. PATENT DOCUMENTS

| | | | |
|---|---|---|---|
| 2,911,727 | 11/1959 | Steinhart | 33/174 L |
| 3,311,233 | 3/1967 | Helmbrecht et al. | 209/73 |
| 3,321,838 | 5/1967 | Albertson, Jr. | 33/174 L |
| 3,364,728 | 1/1968 | Albertson et al. | 73/37.5 |
| 3,966,048 | 6/1976 | Nunes et al. | 209/82 |
| 4,221,053 | 9/1980 | Bobel et al. | 33/174 L |

FOREIGN PATENT DOCUMENTS

1623271  3/1971  Fed. Rep. of Germany .
2248487  5/1975  France .

*Primary Examiner*—Richard R. Stearns
*Attorney, Agent, or Firm*—Pennie & Edmonds

[57] ABSTRACT

Apparatus for checking the profile of a sheet and comparing measured data with that data from measurement of a standard. The apparatus includes a frame, a plurality of studs on the frame providing three support locations for the sheet, a plurality of reference stops spaced along two adjacent sides of the frame and structure along opposite sides for moving a sheet into a centered position at the stops and measuring structure for measuring the profile of the sheet at a centered position. The sheet may be held at the centered position to immobilize it during measurement and the apparatus may be located along a production line including structure for moving a sheet to the frame and removing the sheet from the frame.

10 Claims, 5 Drawing Figures

APPARATUS FOR CHECKING A SHEET HAVING A BENT PROFILE

DESCRIPTION

1. Technical Field

The invention relates to apparatus for checking a sheet having a bent profile to assure that the curvature of the profile meets a required standard. While the apparatus may be used to check any sheet material having a bent profile, one adaptation of use is in the checking of the bent profile of a sheet of glass, such as may find use as a window of an automobile, and more particularly, use as a windshield.

2. Background Art

Developments in the automotive industry relate not only to operational factors but to the aesthetics of the automobile, as well. To this end, the windshields, and some other windows of the more recent automobiles, generally exhibit a more or less pronounced curve. While these windows display a curved profile they nevertheless must be assembled in series on the automobile body, and they must conform faithfully both in size and shape to the window of the designer. Because of this requirement ideally each sheet of glass for use as an automotive window should be checked within the production line to assure that the sheet, in fact, does conform to a standard. In practice, however, with prior art apparatus, it has not been possible to more than spot check. A principal reason for only spot checking resides in the fact that it takes a significant amount of time to accomplish each checking operation. Therefore, only spot checks of one of more sheets of the same production batch are made. Furthermore, the complex nature of the prior art apparatus does not lend itself to more than a spot check type of operation.

One prior art apparatus for checking the profile of a sheet of glass is disclosed in French Pat. No. 2,441,580. According to the French patent, a pattern having a shape that fits that of the glass to be checked throughout substantially all of its outside surface is positioned over the glass. Probe pickups are provided on the pattern for measuring the position of the glass relative to the pattern. The probe pickups are located at spaced locations thereby to obtain measurements from various locations throughout the surface area of the glass.

Apparatus of this type suffers from at least one major disadvantage. To this end, the points of support of a series of glasses, and even the same glass from one checking operation to the next, on the pattern are never identical. Even a slight deviation in the positioning of the glass may result in a considerable difference in the measurement obtained. For example, a deviation of about one millimeter in the positioning of a glass of a dimension of 50 cm×50 cm may be reflected by an error of 0.34 mm in the value of the curve. It is not unheard of that the error may reach and exceed 2 mm in the value of the curve.

The glass, therefore, must be placed on the pattern with precision without, however, any certainty that the points of contact of the sheet with the pattern are invariable reference points. Because of problems of positioning a sheet on a pattern, and the need to avoid any accidental vibrations during the checking operation which slows down the rate of the overall operation, the industry has looked to other techniques. Another reason in the consideration to abandon the pattern technique and look to other techniques resides in the fact that a pattern for each type of sheet is required, with added cost to the operation.

U.S. Pat. Nos. 3,321,838 and 3,364,728 describe apparatus having capability of checking glass objects described as other than glass sheets for automobiles. To this end, these patents describe apparatus for checking objects in the shape of a spherical bowl, such as a television screen, and include structure for holding the screen. The screen includes one or more notches or marks to denote the position at which the screen is to be gripped by the holding structure. These apparatus are considered incapable of functioning at a high rate of speed, and moreover, they are considered incapable of operation in checking the curvature of objects, such as a glass sheet for an automobile which does not include notches or marks for positioning and does not have the particular shape of a spherical bowl.

SUMMARY OF THE INVENTION

The invention is directed to an apparatus for checking the profile of a sheet having a bend and particularly to an apparatus which overcomes the disadvantages of the prior art namely the necessity of use of a pattern and the precision placement of a sheet on the pattern, the necessity to apply marks or notches to the sheet to locate a position for holding the sheet, and others as may be apparent.

According to the apparatus of the invention a sheet whose profile is to be measured may be brought into position for checking without the degree of precision placement heretofore required and without the necessity of application of marks or notches on the sheet for locating a position for holding. The apparatus of the invention is capable of operation in checking the profile of sheets at a high rate of speed after relocation of the sheet to the apparatus and movement to a position at a plurality of reference stops. The apparatus of the invention, therefore, may be utilized to check the profile of all sheets such as sheets of glass, moving along a production line and to provide, as necessary, more definitive correction signals based upon a greater amount of data developed during the checking operations. Further, according to the invention, these improved results are achieved with apparatus of less complex nature than that of the prior art and with less involvement of investment capital in machinery.

The apparatus includes a frame of generally rectangular outline and a plurality of studs for supporting the sheet on the frame. Three studs, for example, stationarily located within the vicinity of three of the corners of the frame have been found to provide adequate support for the sheet. The apparatus also includes structure for moving or centering the sheet in relation to the studs once the sheet is brought to the frame from an upstream station, structure cooperating with at least one stud for holding the sheet in the centered position, and structure for both measuring the curve of the glass and comparing the data as recorded with data developed in the measuring of the curve of a standard or reference.

Rather than the sheet resting on a series of random points of its outside surface, as in the prior art, the apparatus requires that the sheet rest on studs fixed in their positional relationship to one another. Not only does the sheet rest on the studs but it is centered with respect to all studs thereby to obviate the major disadvantages of the prior art apparatus flowing from the nonreproducibility of successive measurements, even with the same sheet, and the lack of reliability of the measurements from successive sheets.

By virtue of the fact that the apparatus includes a frame and studs with substantial open space inside as well as outside the region of the frame, it is possible to utilize a large number of measuring devices for measuring the curve of the sheet. The measuring devices may be in the form of probe pick-ups having significantly less bulk than the bulk of a pattern of the prior art devices.

The structure for moving or centering the sheet in relation to the studs include a plurality of elements fixed to the sides of the frame to provide a rough measure of centering of the sheet, and operative structure for moving the sheet to a position of precise centering. Each element has a flat surface serving as a stop and an inclined, somewhat rounded surface extending toward the flat surface and the frame. The inclined, somewhat rounded surfaces act as guide surfaces in movement of the sheet toward the frame and the supporting studs. The operative structure, including a pair of pushing members, is located on two adjacent sides of the frame and pushes the sheet into a position at which it contacts a stop acting as a reference stop on at least one element fixed to the side of the frame opposite the pushing member. In a preferred embodiment, two reference stops are located at spaced positions opposite one pushing member and a single reference stop is located opposite the other pushing member. Thus, the reference stops and the studs locate the sheet with precision prior to commencement of a measuring operation.

A holding structure including an elastic stop is operatively moved to a position on the sheet, over a stud, to immobilize the centered sheet against any accidental vibration during the measuring operation. The elastic stop, as well as the pushing members, may be operated by a jack or the like and the elastic stop, in the event of only a single elastic stop, acts perpendicular to the one of the three studs, for example, the center stud.

The sheet may be located to the apparatus by a structure including a suction cup system and released on the frame without any special care in locating the same relative to the studs. The sheet will locate to a roughly centered position on the studs through movement along the inclined surfaces of the elements, and, then, the sheet may be precisely centered and held in the centered precision as a checking operation begins.

The several operations may be synchronized automatically by a control, responsive initially to a signal representing the presence of a sheet on the studs. The synchronized operations of centering, holding and measuring may be carried out rapidly. The time required for the above operative cycle may be about 0.8 seconds per sheet, whereas the manufacture of a sheet requires some more time, the period between two successive deliveries of a sheet varying between one and three seconds.

Because of the time considerations it should be clear that the overall process of locating a sheet to the frame, centering the sheet on the frame, holding the sheet in the centered position, measuring the contour of the profile, and removing the sheet from the frame may be carried out on each sheet in the production line thereby to assure the highest quality of finished product as may be produced. Further, the operation may be carried out more easily.

Further advantages of the invention will become clear as the description of a preferred embodiment continues.

BEST MODE FOR CARRYING OUT THE INVENTION

Figure 1:
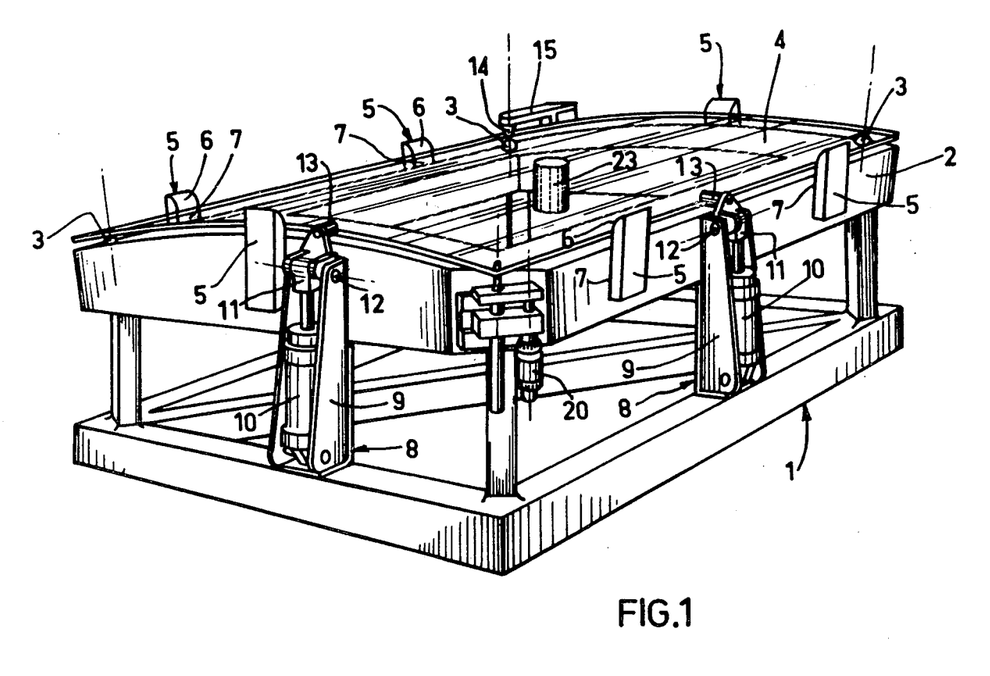
FIG. 1 is a perspective view, diagrammatic in nature, of the apparatus of the invention.

The preferred embodiment of the apparatus of the invention perhaps may be seen to best advantage in FIG. 1. Referring to that Figure, the apparatus, capable of checking the profile of a sheet which is other than planar includes a base 1 secured stationarily to the floor of a manufacturing facility. The base may be formed of a plurality of interconnected outer channel members (see FIG. 3) and one or more cross members, such as the cross member illustrated as extending between opposite corners for stabilizing the outer members of the base. A frame 2 is supported by a plurality of stanchions above the base. The frame serves to support a sheet 4 whose profile is to be checked. The frame may have a profile like that of the sheet to be checked, although this is not a requirement.

The sheet 4 may be a sheet of any particular makeup bent from a planar form to a profile of arcuate or curved outline. As previously indicated, the sheet may be of any particular form and sheets of glass, such as glass for automobiles and, particularly, a sheet of glass serving as a windshield have been successfully checked for profile by the apparatus to be described.

The frame 2 comprises a structure of substantially rectangular outline and the stanchions may be located to support the corners of the frame. The frame may be of any particular construction, as may be conventional.

A plurality of studs 3 are carried by frame 2. As may be seen in FIG. 1, the studs are positioned at three of the four corners of the frame and provide support for sheet 4 which is moved to the frame. The studs, in the adaptation of the apparatus in checking the profile of a curved glass sheet, preferably will be formed of a material which will adequately support the sheet, yet not mar or otherwise scratch the glass sheet during manipulative placement and removal. A elastic material, such as rubber or plastic generally will provide this capability. As may be seen in FIG. 2, each stud is carried at the end of a threaded shank, and the stud is received into a threaded bore in the upper surface of frame 2. The manner of receipt of the studs on frame 2 permits positional adjustment of the support surface relative to the frame to accommodate any particular profiled contour of glass sheet.

A plurality of elements 5 serving as positioning or guiding elements are carried along the outer surface, laterally of frame 2. As may be seen in FIG. 1 a pair of elements are located at spaced dispositions along two opposed sides of the frame generally opposite one another, and a positioning element is located along each of the other sides, likewise, generally opposite one another.

Each element is mounted stationarily to frame 2. Any manner of mounting may be employed. The elements are generally rectangular in outline and include on the side toward the frame a flat surface 7 and a surface 6 of inclined, somewhat rounded outline. The latter surface of each element extends from its upper end, above frame 2, toward the flat surface and functions to guide the sheet into position on studs 3. The flat surfaces, likewise, extend above frame 2. The flat surfaces of some of the elements as will be discussed, serve as reference stops against which the sheet is moved preparatory to the checking operation.

A unit 8 for moving the sheet is located along each of two adjacent sides of frame 2. Each unit is located at substantially the midpoint of the frame side and acts upon an edge of sheet 4 having theretofore been guided into supported position on studs 3. Thus, one unit functions to move the sheet in one direction and the other unit functions to move the sheet in a direction normal to the first direction with a resultant relocation of the sheet to a reference stop position as determined by flat surface 7 of each element 5 on the side of frame 2 opposite that side along which the units 8 are disposed.

Each unit 8 includes a frame 9 and a jack 10 which may be hydraulically, pneumatically or similarly controlled. The frame, see FIG. 1, is formed by an L-shape plate member and a pair of spaced side walls connected such as by welding, at the base and along the edges of the plate member. The side walls extend to the region of the side surface of frame 2. Both side walls are secured to the frame. The base of the plate member is secured to base 1. Securement may be accomplished by welding, also.

Jack 10 is mounted on frame 9 within the space between the side walls.

To this end, an ear may project from the end of the jack adjacent base 1 and a pin, supported between the side walls, and received through the ear, may support the jack for movement pivotally around the pin. A shoving element 11 is connected to the rod of jack 10 and, in turn, mounted pivotally by pin 12 between the side walls of frame 9. A push rod 13 extends from one arm of the shoving element toward frame 2 and the glass 4 to be moved toward the reference stops. The shoving element functions in a manner similar to a bell crank whereby the push rod moves toward the glass as the jack rod extends, pivoting the other arm around pin 12, and away from the glass as the jack rod retracts. This movement is accommodated by the capability of the jack in pivoting about its mounting connection at the base 1.

A gripping member 14 is movable into and out of engagement with the sheet 4 thereby to secure the sheet on the studs 3 and against the several reference stops. Normally one gripping member acting perpendicular to the sheet will be sufficient to immobilize it for the checking operation.

Figure 2:
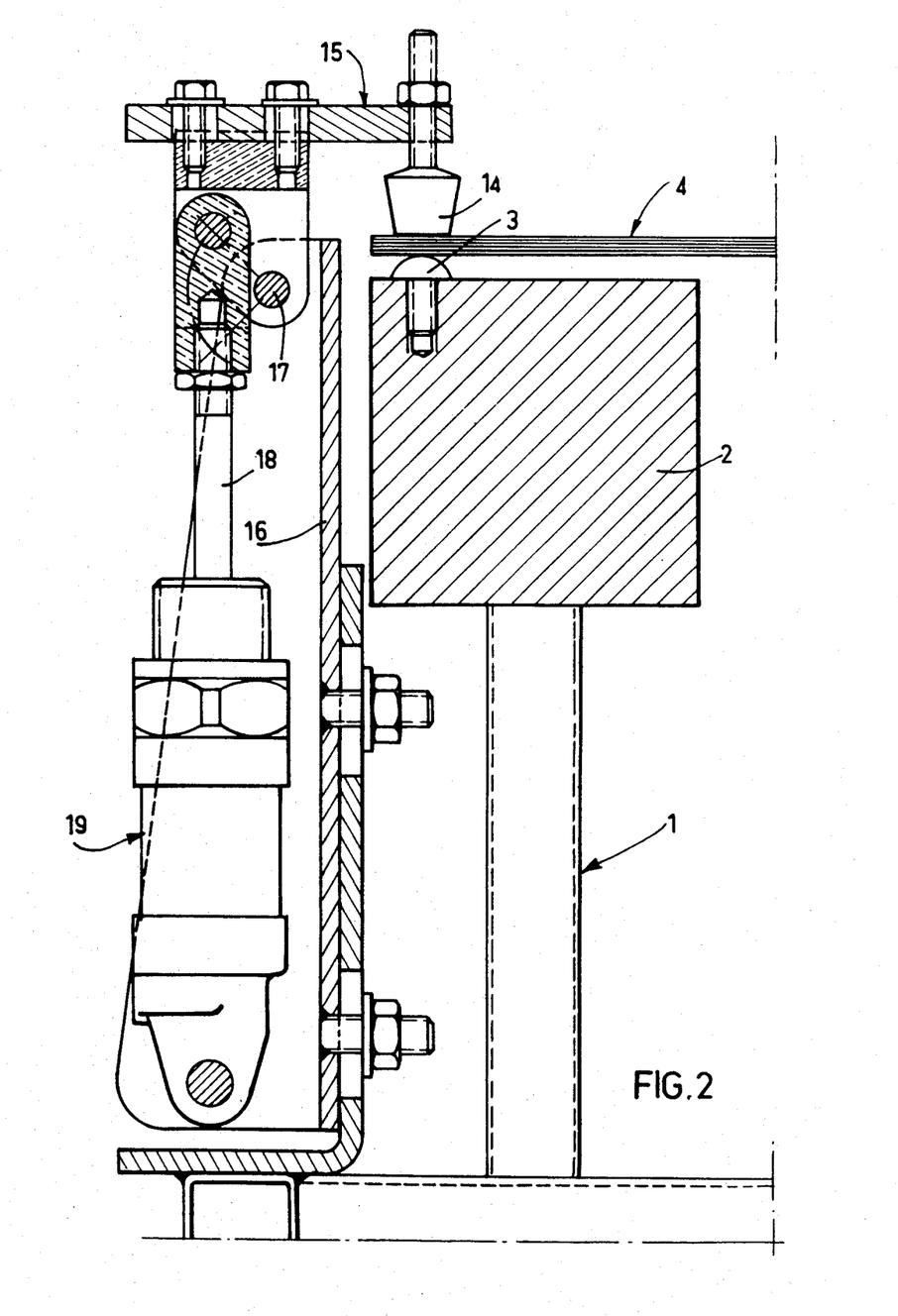
FIG. 2 is an elevational view, on an enlarged scale, of structure for gripping sheet on the apparatus during checking of its curvature.

The gripping member 14 and the operative structure for moving the gripping member may be seen perhaps to best advantage in FIG. 2. The structure is somewhat duplicative of the structure preciously described in the discussion of the unit 8. To this end, an L-shaped plate is attached to base 1 and a frame 16 including a pair of side walls and a web is connected to the plate thereby to extend upwardly to frame 2. The frame 16, as illustrated, is connected to the plate by a pair of spaced bolts.

A jack 19, controlled in the manner of jack 10, is mounted on frame 16. To this end, an ear may project from the end of the jack adjacent base 1 and a pin, supported between the side walls, and received through the ear, may support the jack for movement pivotally around the pin for reasons previously set out.

Gripping member 14 may be likened to push rod 13 insofar as the manner of movement is concerned. Thus, the gripping member is carried by head 15 comprising one arm of a bell crank-type structure mounted between the side walls of frame 16 for movement pivotally around pin 17 extending between the side walls. The other arm of the bell crank-type structure is connected to rod 17 movable relative to jack 19. Thus, when rod 18 extends gripping member 14 moves through a clockwise arc of movement to the position of FIG. 2, and when the rod retracts the gripping member moves oppositely to permit sheet 4 to be removed from the frame to ready the apparatus for placement of a subsequent sheet on the frame preparatory to centering and checking. The gripping member and the push rod, also, preferably are formed of a material like that of stud 3 so as not to mar or otherwise damage the sheet.

A number of probe pickups 20 (see FIGS. 1 and 3) capable of measuring the position of a sheet are located at various positions around frame 2. The number of probe pickups is determined by the criterion of exactness to be achieved in measurement of the position and profile of the sheet. Referring to FIG. 1, there is illustrated a single probe pickup to be considered representative of all probe pickups. However, the probe pickups may be located on both the outside and inside of frame 2. The probe pickups further, may be of any known type.

In FIG. 1, the probe pickup is disposed along a flattened corner of frame 2. For example, the probe pickup may be secured to a plate in a channel between a pair of spaced shoulders. The probe pickup includes a rod which extends toward the sheet 4 when received on frame 2. The rod is retractable under the weight of the sheet so that it will not cause any damage to the surface. Each of the probe pickups may be precisely adjusted by a micrometric screw to the surface contour of a control sheet whose profile is known. Each rod, thus, is precisely adjusted.

Figure 3:
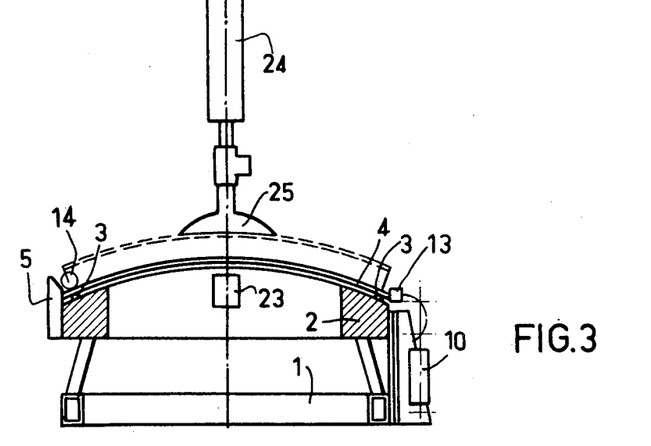
FIG. 3 is an elevational view of structure for locating the sheet to the apparatus of FIG. 1.
Figure 4:
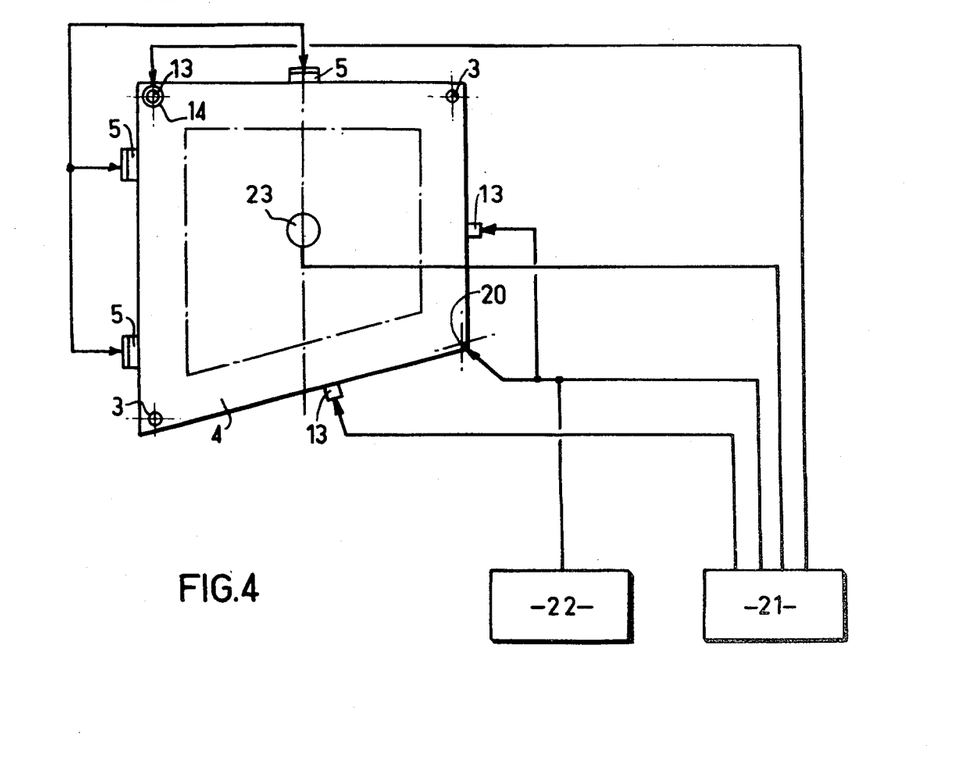
FIG. 4 illustrates a programming system for checking curvature of a sheet.

Referring to FIG. 4, it may be seen that the apparatus is controlled in operation by a control 21 for programming and processing data. The control which may be connected to a recorder 22 is also connected to the various operative structures previously discussed for centering the sheet against the reference stops (units 8), for holding the sheet when centered (gripping member 14) and for response to each probe pickup 20 indicative of a measurement of the position of the sheet. The control continuously controls the operating cycle of each measurement which may be considered to commence when a sensor 23 (see FIGS. 1, 3 and 4) senses that a sheet has been located to frame 2.

The apparatus of the invention may be positioned in a fabrication line (see FIG. 5) between upstream and downstream processing stations. Referring to FIG. 3, there is illustrated a holding device 24 and a suction cup 25 supported by the holding device. This structure may be conventional, and the suction cup, attached to a suitable source of vacuum, will serve to grip the sheet for movement with the holding device to about the dotted line position in FIG. 3. The sheet is released at about the location of the inclined surface 6 of elements 5 which guide the sheet toward studs 3 to reside in a checking position on the support provided by the studs. Sensor 23 located generally in the center of frame 2, responds to this action to activate control 21. The control, in turn, causes an operative action both of the units 8 to move the sheet from the checking position to the position of the reference stops (the reference stops, opposite the units 8, are designated by the arrows in FIG. 4), and the gripping member 14 which moves into contact with the sheet which then is immobilized between the stud and the gripping member acting perpendicularly on the sheet. The reference stops provide a reference position at which the measurement is to be taken and the gripping member assures that the sheet, once moved to the reference position remains immobilized at the reference position without vibrations as the units 8 retract and as the measurement is taken.

The measurement of the profile of sheet 4 is by the several probe pickups. Information is communicated to the control 21 and recorder 22 for comparison with a prescribed reading from the control sheet.

Once the measurement of the sheet is completed, the gripping member 14 releases the sheet for movement with the holding device 24 and suction cup 25 to a downstream station for further processing, or the sheet is rejected if it fails to meet required curve standards.

Figure 5:
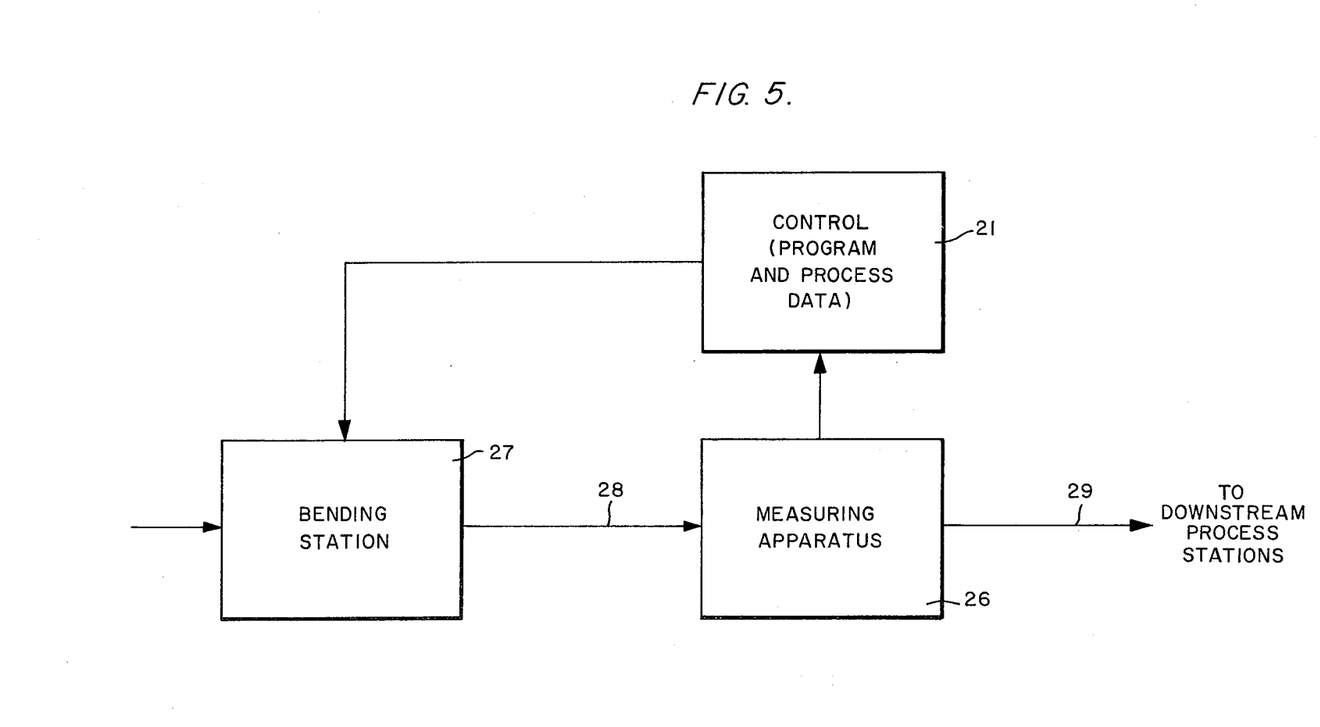
FIG. 5 illustrates in block form, a processing line for sheet material.

Referring to FIG. 5, there is illustrated a production line along which a sheet 4 travelling from an upstream location is bent to a curved profile and, then, at a downstream location, the curved profile of the sheet is measured. Data from the measurement is compared with data derived from a reference standard, and if there is a sufficient comparison with the reference standard the sheet moves further downstream to and through other processing stations. If a sufficient comparison is not found the sheet 4 is rejected. The upstream stations may include a bending station 27 and the comparison of data is carried out in control 21 which is connected to the measuring device 26, all as previously discussed. The control 21 is capable of generating a correction signal which is connected to the bending station and for regulating operation of the bending station. The arrows 28, 29 represent conventional conveyor apparatus for conveying a sheet 4 along the production line from the upstream to the downstream station.

The measuring operation may be carried out at a high rate of speed, for example, within one seconds' time, and particularly in about 0.8 seconds' time. Therefore, unlike prior art operations during which spot checks were made to assure integrity of product, the apparatus of the invention makes it possible to check every manufactured sheet to determine whether the sheet meets required curve standards.

Checking of the profile of each sheet, further, is carried out at low cost and with apparatus of relatively uncomplex construction.

A further advantage to be realized by checking each sheet is that the total information gathered will be more accurate than the total information gathered from spot monitoring, and the information, as gathered, may be analyzed so that more accurate correction signals may be generated to regulate upstream stations, particularly the station at which the sheet is bent.

I claim:

1. Apparatus for measuring the curved profile of a sheet comprising
    (a) a frame of generally rectangular outline,
    (b) at least three studs supported by the frame to extend from an upper surface to provide point support for said sheet which is adapted to be located to said frame, each said stud mounted by said frame in a fixed positional relationship,
    (c) means for locating adjacent edges of said sheet supported on said studs to a reference position,
    (d) means for holding said sheet in said reference position, and
    (e) means for measuring a surface contour at a number of surface locations within said sheet and comparing the data with data from the measurement of a reference standard.

2. The apparatus of claim 1 wherein each said stud is disposed within the region of a corner of said frame.

3. The apparatus of claim 1 wherein said locating means comprises
    (a) a plurality of stops fixed to said frame, at least one stop being fixed along each side, and each stop additionally providing means for guiding said sheet to a position for support by said studs, and
    (b) a pair of drive elements disposed along adjacent sides of said frame adapted to move said sheet laterally relative to said studs into engagement with said stops along opposite sides of said frame.

4. The apparatus of claim 3 wherein each stop includes a flat surface comprising a reference stop at said reference position and a surface inclined toward said frame, said inclined surface comprising said guiding means for said sheet.

5. The apparatus of claim 4 wherein one of said drive elements move said sheet laterally toward a pair of reference stops spaced along a side of said frame opposite said drive element and the other of said drive elements moves said sheet laterally toward a single reference stop along the side of said frame opposite said last-mentioned drive element.

6. The apparatus of claim 1 wherein said means for holding said sheet in said reference position includes
    (a) a gripping member comprised of an elastic head, and
    (b) means for moving said elastic head between positions of engagement with said sheet to act along the axis of one of said studs and a retracted position whereby said sheet may be removed from said frame.

7. The apparatus of claim 1 further including responsive means for signalling the presence of said sheet on said frame.

8. The apparatus of claim 7 further including a device for programming and processing said data, said device operating in response to a signal from said responsive means for purposes of activating and synchronizing the action of each of said locating means, said holding means, and said measuring means.

9. The combination of a production line for producing sheets having a curved profile, apparatus for measuring said curved profile comprising a frame of generally rectangular outline, at least three studs supported by the frame to extend from an upper surface to provide a point support for said sheet which is adapted to be located to said frame, each said stud mounted by said frame in a fixed positional relationship, means for locating adjacent edges of said sheet supported on said studs to a reference position, means for holding said sheet without vibrations in said reference position, and means for measuring a surface contour at a number of surface locations within said sheet and comparing the data with data from the measurement of a reference standard, and means for moving said sheet from an upstream location to a downstream location in said production line after said surface contour is measured under circumstances, only, if said measurement data is compared favorably with the measurement data of said reference standard.

10. The combination of claim 9 including a device for programming and processing said data, and wherein said programming and processing device connects the apparatus for measuring the surface contour to upstream station locations including a bending station, and said connection providing a connection for correction signals generated to regulate each said station as measurement datas of the surface contour of the sheets may differ from the measurement datas of a reference standard.

* * * * *

UNITED STATES PATENT AND TRADEMARK OFFICE
CERTIFICATE OF CORRECTION

PATENT NO. : 4,473,953

DATED : October 2, 1984

INVENTOR(S) : Philippe Sauvage

It is certified that error appears in the above-identified patent and that said Letters Patent are hereby corrected as shown below:

Col. 3, line 38, "the" should be deleted.

Signed and Sealed this

Seventh Day of May 1985

[SEAL]

Attest:

DONALD J. QUIGG

Attesting Officer     Acting Commissioner of Patents and Trademarks